March 24, 1931. J. VON BERG 1,798,007
MACHINE FOR MOLDING AND SHAPING ROLLS AND THE LIKE
Filed Sept. 16, 1929 3 Sheets-Sheet 1
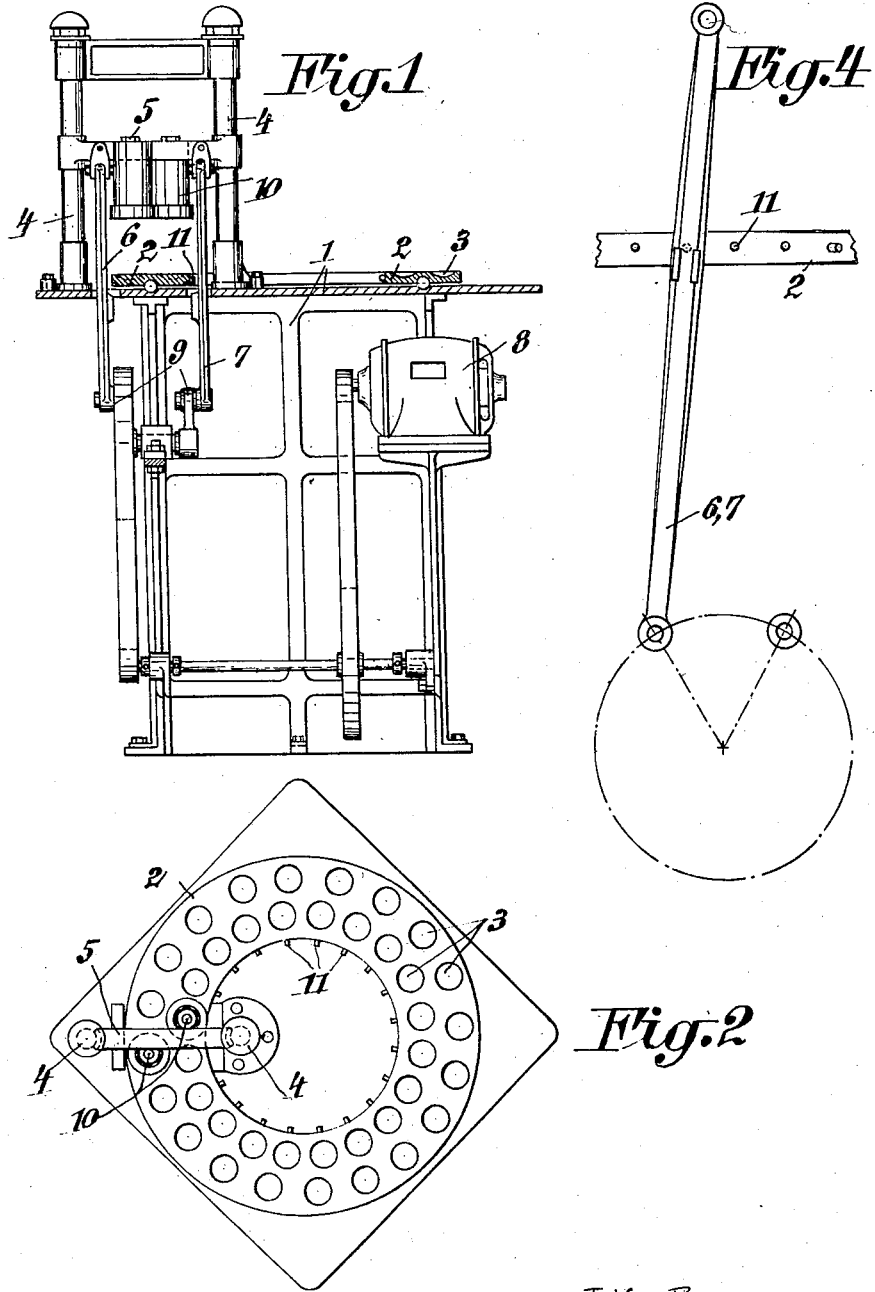

March 24, 1931. J. VON BERG 1,798,007
MACHINE FOR MOLDING AND SHAPING ROLLS AND THE LIKE
Filed Sept. 16, 1929  3 Sheets-Sheet 2
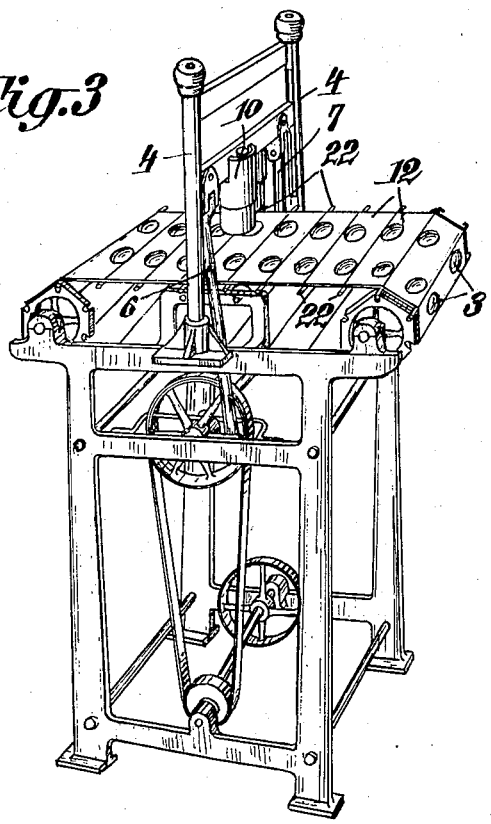

March 24, 1931. J. VON BERG 1,798,007
MACHINE FOR MOLDING AND SHAPING ROLLS AND THE LIKE
Filed Sept. 16, 1929   3 Sheets-Sheet 3
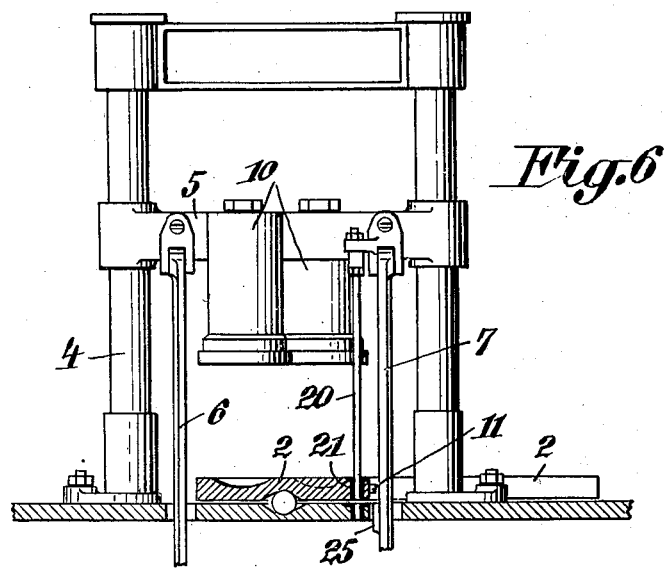
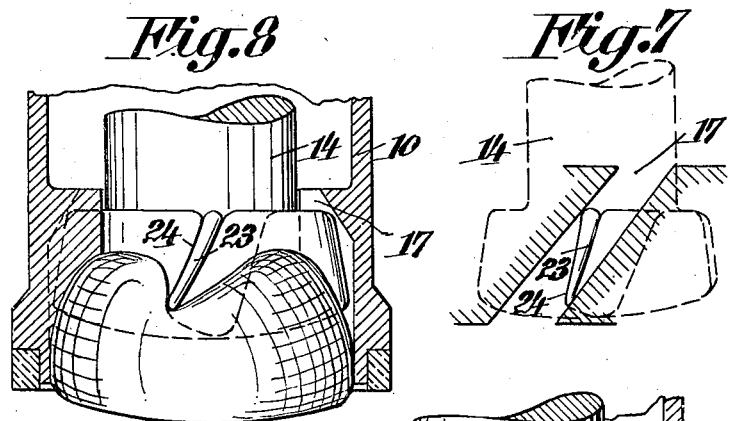
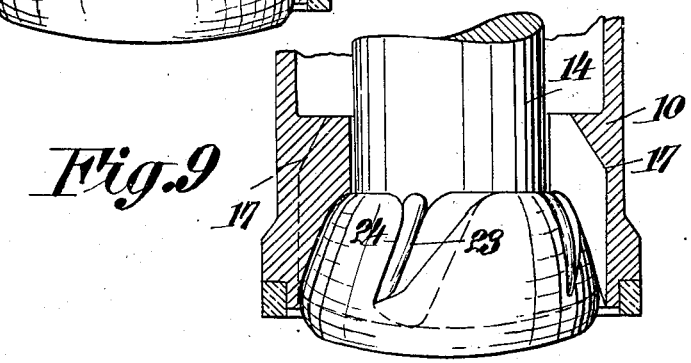
J. Von Berg, INVENTOR Patented Mar. 24, 1931

1,798,007

UNITED STATES PATENT OFFICE

JULIUS VON BERG, OF VIENNA, AUSTRIA, ASSIGNOR TO MAXIMILIAN GRUNBERGER, OF VIENNA, AUSTRIA

MACHINE FOR MOLDING AND SHAPING ROLLS AND THE LIKE

Application filed September 16, 1929, Serial No. 392,908, and in Austria, October 27, 1928.

The known machines for shaping rolls and the like are of very complicated structure and possess the further drawback, that for molding the baker's ware either no molding device at all or a molding device, which is separated and independent from the shaping device, is provided for molding the baker's ware during a separate working operation. The known devices have to be greased very well which is inadmissible in the case of dough. The cups and shaping dies do not fit any more in the event of the least wear.

According to the present invention, the baker's wares, hereinafter termed rolls, are molded and shaped in a single device and in a single operation. In order to attain this object an annular rotary table or an endless train of molding plates, provided with grooves or cavities for molding the bottom side of the rolls, is fed by means of connecting rods which engage pins arranged on the table or train of molding plates and at the same time operate the shaping device, in which the dies are arranged in pairs and the cavities or the like are suitably grouped.

Two modes of carrying out the present invention are illustrated by way of example on the accompanying sheets of drawings in which:—
Figs. 1 and 2 show a machine in sectional front view and in plan view respectively.

Fig. 3 is a perspective view of a modified construction of the machine.

Figs. 4 to 9 are detail views.
In the construction shown in Figs. 1 and 2, an annular table 2 is mounted, by means of balls or the like, readily rotatable on a frame 1. The annular table 2 is provided with suitable cavities 3 for the reception of dough-lumps. A cross-piece 5 is slidably mounted on supports 4, arranged outside the annular table 2. Connecting rods 6 and 7, attached to the cross-piece 5 and to cranks 9, which are operated by an electromotor 8, effect the up and down sliding of the cross-piece 5 on the supports 4. Cylinders 10, provided with the shaping device, are arranged on the cross-piece 5 and placed at the desired moment onto the corresponding dough-lumps and in this way carry out the shaping operation, e. g. they provide the dough with suitable indentations or notches, and subsequently the cylinders 10 are returned into the initial position. The table 2 provided with the dough-lumps is fed forward in conformity with the up and down movement of the cylinders 10, containing the shaping or indenting devices. The movement of the connecting rods is utilized for carrying out this object. According to the invention, the connecting rod 6 is provided at its inside with a guide, which cooperates with pins 11, arranged on the inner face of the annular table 2. In one inclined position of the connecting rod, the guide engages the pin for such a time until the said connecting rod has come into the corresponding opposite position. During this period the table 2 is rotated, while during the further movement of the connecting rod the rotation of the table is stopped, because the engagement between guide and pin is interrupted (Fig. 4). As shown in Fig. 6, before the guide of the connecting rod slides off from one of the pins 11, a guide-pin 20, which is rigidly attached to the cross-piece 5, engages holes 21 of the annular table 2 and corrects small inaccuracies in the feed of the table and further secures the latter before the cylinder 10 is pressed onto the annular table 2. When the connecting rod comes into the subsequent inclined position, the next pin 11 engages extensions 25, is again released and so forth, so that the annular table is continuously fed in positive conformity with an up and down movement of the cylinders 10.

As shown in Fig. 3, a base in the shape of an endless band may be arranged in place of the annular table 2. In this construction the base comprises a number of plates 12, which are hinged to one another and at both sides are provided with teeth or cams 22, which are engaged by the connecting rods 6 and thus the endless train of plates 12 is fed forward in exactly the same manner as above set forth. This construction has the further advantage that, if desired, the intended or shaped dough-lump can be automatically ejected onto a feed band arranged at a convenient place.

The indenting or shaping device comprises a piston 13, arranged in the cylinder 10 and in which the indenting die 14 is mounted rotatable in an axial manner. During the descent of the cross-piece 5, the packing ring 15, forming the bottom edge of the cylinder 10, at first cooperates with the base 12. The bottom face of the indenting die 14 in conjunction with the inner face of the cylinder 10 constitute an inverted cup, which has to be adapted to the rolls to be made. During the further descent the spring 16 is compressed and the indenting die 14 is pressed into the dough, whereby the latter is axially turned and thus is screwed into the dough because the lateral ends of the wings of the said die cooperate with guide-grooves 17 in the wall of the cylinder 10. During the ascent of the cross-piece 5, the action of the spring 16 will cause the withdrawal of the indenting die 14 from the dough, e. g. the said die is at first screwed out of the dough and subsequently the cylinder is lifted away from the base 12. The axially arranged balls 18 and the ball-bearing 19 facilitate the rotation of the indenting die 14 in the one and in the other direction of rotation respectively. The guide-grooves 17 (Figs. 7, 8 and 9) in the shaping surface of the cylinder 10, enclosing the dough to be treated, are arranged in such a manner that, during the penetration of the indenting wings 23 of the die 14 into the dough, the said wings are shifted in an inclined direction in such a manner, that the indentation formed by the indenting wings 23 is larger than corresponds to the volume of the latter. In view thereof the dough cannot adhere to the die during the withdrawal of the latter and the operation of indenting by hand is exactly copied, and the dough is not simply cut or punched as heretofore. Cut or punched dough always sticks and therefore the punching faces have to be oiled. This drawback is dispensed with according to the present invention, because during the ascent of the indenting die, the bottom-most edge of the indenting wings smoothens the indentation formed in the dough.

According to the present invention, the cylinder 10 consists of two parts, which are connected in such a manner, that they can be readily removed from each other, so that the device can be readily adapted to any desired shape of rolls or baker's ware by exchanging the bottom part of the cylinder and inserting another molding or shaping die.

I claim:—

1. Machine for molding and shaping rolls and the like, comprising in combination a rotatable circular table, cavities in the same adapted to locate the dough-lumps to be treated, a die adapted to shape the upper side of the dough lump, and means connected with said die adapted to raise and lower the same and connected with said table for the stepwise feed of the latter.

2. Machine for molding and shaping rolls and the like, comprising in combination a rotatable annular base, cavities in the same shaped according to the bottom side of the roll, a die adapted to shape the upper side of the roll, a connecting rod attached to and adapted to raise and lower the die, and extensions on said base adapted to cooperate with said connecting rod for the stepwise feed of said base.

3. Means for molding and shaping rolls and the like, comprising in combination a moving base, cavities in the same shaped according to the bottom side of the roll, a die adapted to shape the upper side of the roll, a connecting rod attached to and adapted to raise and lower the die, a guide on said rod, and extensions on said base adapted to cooperate with said guide for the stepwise feed of the base.

4. Means for molding and shaping rolls and the like, comprising in combination a moving base, cavities in the same shaped according to the bottom side of the roll, a die adapted to shape the upper side of the roll, a connecting rod attached to and adapted to raise and lower the die, a guide on said rod, extensions on said base adapted to cooperate with said guide for the stepwise feed of the base, holes in said base, and a pin fixed to said die and engaging one of said holes in the lowered position of the die, so that the die becomes adjusted and secured in the proper operating position.

5. Machine for molding and shaping rolls and the like, comprising in combination a moving base, cavities in the same shaped according to the bottom side of the roll, a cylinder, a spring-pressed piston adapted to slide in said cylinder, a die with shaping wings axially rotatable in said piston and adapted to shape the upper side of the roll, guide-grooves in the wall of the cylinder engaged by said wings, the bottom side of the die as well as the inner face of the cylinder enclosing the die and the cavity in the base constituting the chamber enclosing the piece of dough to be treated, operating means attached to and adapted to raise and lower said cylinder, and extensions on said base adapted to cooperate with said means for the stepwise feed of the base.

6. Machine for molding and shaping rolls and the like as described in claim 5 in which the effective faces of the die-wings are arranged at a smaller angle with respect to the axis of the die than it is the case with respect to the guide-grooves in the wall of the cylinder.

7. Machine for molding and shaping rolls and the like, comprising in combination a moving base, cavities in the same shaped according to the bottom sides of the roll, a cylinder consisting of two parts detachably connected with each other, two pistons one in each part of the cylinder combination, a die arranged axially rotatable in said cylinder and adapted to shape the upper side of the roll, operating means attached to and raising and lowering said cylinder, and extensions on said base cooperating with said means for the stepwise feed of the base.

In testimony whereof I affix my signature.

JULIUS von BERG.